F. BECHOFF.
INDICATOR FOR CONTROLLING SWITCHES.
APPLICATION FILED FEB. 1, 1918.
1,328,073. Patented Jan. 13, 1920.
2 SHEETS—SHEET 2.
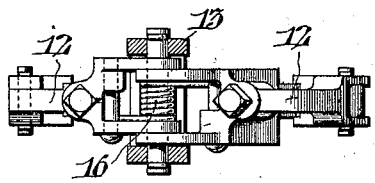
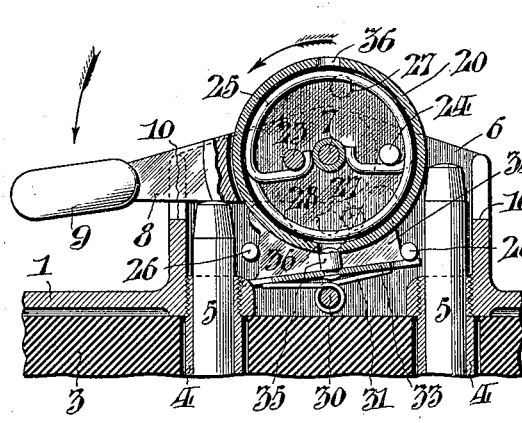
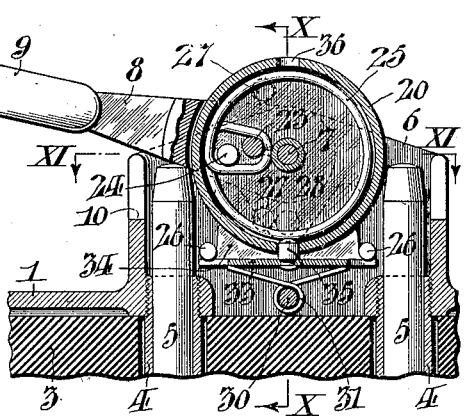
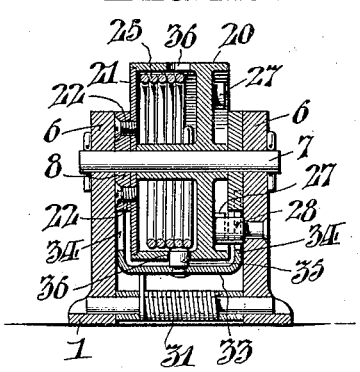
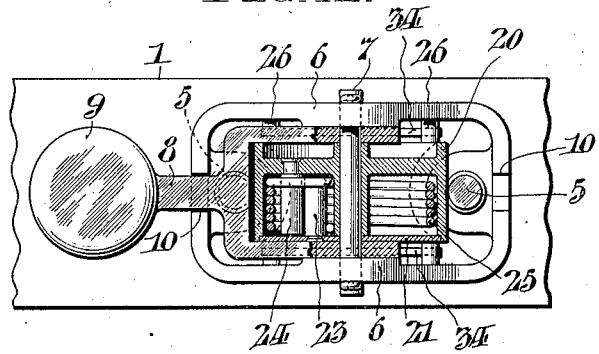
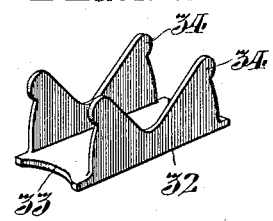
Inventor
Ferdinand Bechoff,
Attorneys

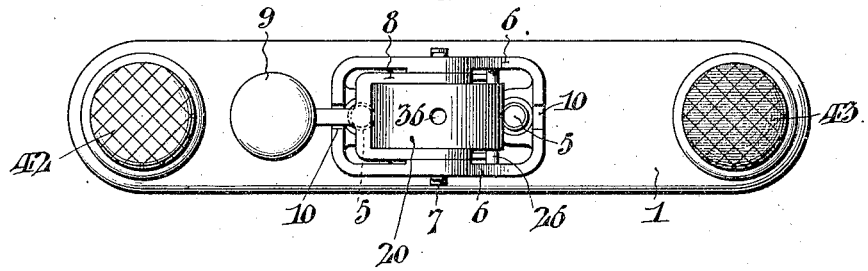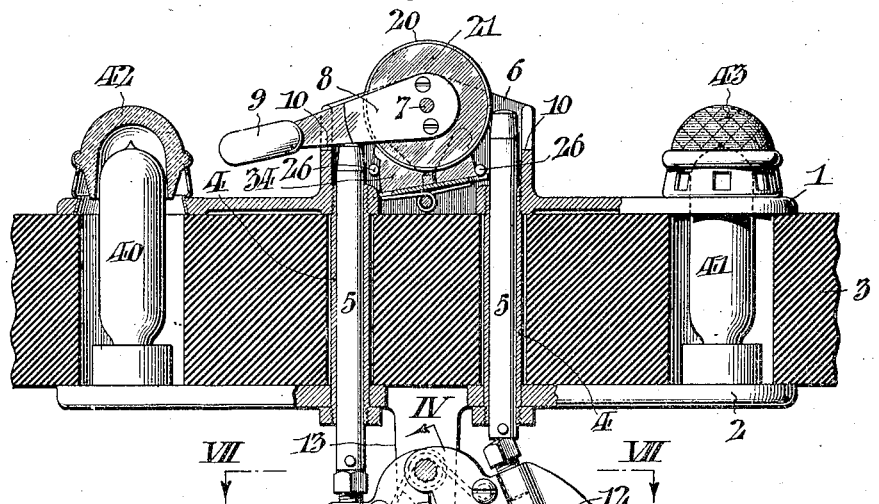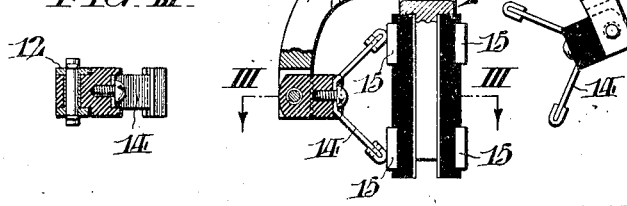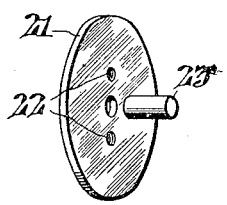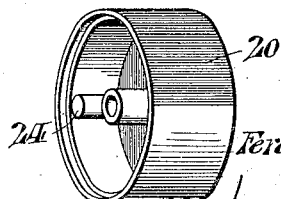

UNITED STATES PATENT OFFICE.

FERDINAND BECHOFF, OF NEW YORK, N. Y.

INDICATOR FOR CONTROLLING SWITCHES.

1,328,073.   Specification of Letters Patent.   Patented Jan. 13, 1920.

Application filed February 1, 1918. Serial No. 214,980.

*To all whom it may concern:*

Be it known that I, FERDINAND BECHOFF, a citizen of the United States, residing in the city, county, and State of New York, have invented certain new and useful Improvements in Indicators for Controlling Switches, whereof the following is a specification, reference being had to the accompanying drawings.

My invention relates to an indicator employed as an adjunct to an electrical controlling switch adapted for the remote control of electrically actuated devices such as circuit breakers. In such controlling switches the depression of a control lever to one side or the other alternatively establishes electrical circuits by which said control is effected. The establishment of such circuits is momentary and in order that the operator may be sure that he has so thrown the control lever as to establish the desired circuit, an indicator such as I am about to describe is provided which displays a visible sign, such as a colored disk, to indicate the establishment of the desired circuit.

The indicator is so constructed that notwithstanding the movement of the control lever, in the proper direction, almost to the point of establishment of the circuit, no display takes place, whereas the moment the circuit is actually established the indicated sign or color appears.

In the accompanying drawings, Figure I, is a plan view, and

Fig. II, a central sectional view of a controlling switch, having attached thereto an indicator embodying my invention.

Figs. III, IV, and VII, are detail sectional views along the lines III, III, IV, IV, and VII, VII, of Fig. II, and relate rather to the controlling switch, than to the indicator.

Figs. V, and VI, are detail perspective views of the plate and drum used in connection with the indicator.

Figs. VIII, and IX, are sectional views of a portion of the control switch, taken so as to show the indicator in differing positions.

Fig. X, is a cross sectional view along the line X, X, of Fig. IX.

Fig. XI, is a horizontal sectional view along the line XI, XI, of Fig. IX, and

Fig. XII, is a perspective view of the cradle which forms part of the indicator.

The controlling switch comprises a front plate 1, and a back plate 2, mounted upon a panel 3, and connected by sleeves 4, within which are plungers 5, 5. The central portion of the front plate 1, is cut away, and around the edges of the cut-away part are erected walls 6, between which is set the pivot 7, carrying the control lever 8, the pivoted end of which is bifurcated while the free end carries the handle 9. Slots 10, 10, in the wall limit the motion of the control lever, which, as it is thrown to one side or the other, pushes one or the other of the plungers through its sleeve, thereby effecting the actuation of one or the other of the contact levers 12, 12, which are pivoted upon a standard 13, formed upon the back plate 2. These contact levers carry bridge contacts 14, which electrically bridge the stationary contacts 15, 15, establishing the desired circuits. A coiled spring 16, has its ends attached to the contact levers so as to normally press both of them into position in which the bridge contact is separated from the stationary contacts, and therefore the circuits open.

The parts thus far described relate to my controlling switch, as I have shown and described it in more detail in connection with an application which I am about to execute and file in the United States Patent Office simultaneously herewith, and further description of the controlling switch will, therefore, be here omitted, and this application will be confined to the indicator, as employed therewith.

Upon the pivot 7, which carries the bifurcated control lever 8, and between the bifurcations thereof is mounted a rotatable drum 20, which is seen indicated in Fig. VI. A disk 21, (Fig. V) fits upon the top of the drum and forms a closed cylinder, the disk and the drum being separately rotatable. This disk 21, is fixedly attached as by screws passing through screw holes 22, 22, to the bifurcated side of the control lever 8, as more particularly seen in Figs. X, and XI. Set upon the inner side of the disk 21, is a pin 23, and set upon the opposing side of the drum 20, is a pin 24. The pin 23, is nearer the pivot 7, than the pin 24, so that they can rotatively pass each other. A coiled spring 25, lies within the drum with its extremities turned in so that they are caught by the pins 23, 24, as they are rotated around the pivot. Set between the walls 6, below the pivot 7, is a bar 30, around which is coiled a spring 31, the extremities of which are prolonged to form a spring support for a cradle 32, which is shown in detail in Fig. XII, consisting of a base 33, and side pieces 34. Set in the middle of the base is a short pin 35. The movement of the cradle, under the pressure of its spring support is limited by pins 26, set in the walls 6. Apertures 36, 36, formed on opposite sides of the periphery of the drum are capable of registering with the pin 35, and receiving it as a locking pin when the pressure of the spring 31, forces it therein. On the side of the head of the drum are set stop pins 27, 27, in position to come into contact with a pin 28, set in the wall 6, whereby the rotation of the drum is limited and whereby it is compelled to come to rest with one of the apertures 36, in registry with the pin 35.

The outside of the periphery of the drum 20, is painted or colored in two contrasting colors each occupying half a circle.

The operation of my device is as follows:

When the handle is thrown to one side or the other, the corresponding plunger is pushed through its sleeve forcing the corresponding contact lever to bridge its stationary contacts. Such bridging with closure of the circuit, however, does not occur until the plunger has been forced to its extreme position, and it is for the purpose of indicating that the circuit has been thus closed that the colored periphery of the drum 20, is employed as an indicator. Let it be supposed that the parts are in the position shown in Fig. VIII, the visible portion of the periphery of the drum being painted for example green, the other half (painted red) being entirely invisible. In this position, the drum is fixed by the engagement of the aperture 36, by the pin 35, in the base of the cradle, which has been pressed into it by the coil spring 31. This holds the drum from rotation notwithstanding the fact that torsional energy has been stored up by the coiling of the spring 25, consequently upon the rotation of the pin 23, to the position shown in the figure carrying the end of the coil spring 25, with it. In the position of the parts shown in the figure, the control lever 8, is in contact with the upper end of one of the plungers. The further depression of the control lever pushes the plunger down causing the bridging contact mounted on the corresponding contact lever to approach the stationary contacts. As this occurs the bifurcated sides of the control lever come in contact with and force down the corresponding end of the cradle, thus gradually withdrawing the pin 35, from engagement with the aperture 36, but such withdrawal is not completely effected until after the depression of the control lever has reached the point where the bridging contact has completely bridged the stationary contacts, and established the desired circuit; but when this has been accomplished, the control lever having reached the position shown in Fig. VIII, releases the drum from the pin 36, so that the coiled spring within the drum effects its instantaneous semi-rotation to a position to display the heretofore concealed red side of its periphery, indicating to the operator that the desired circuit has been established.

Whereupon the operator releases the lever 8, which immediately returns to the position of Fig. IX. If now the control lever be turned in the other direction, to operate the other plunger, it again stores up torsional energy by the coiling of the spring which continues until complete depression of that plunger simultaneously with which the depression of the cradle effects the release of the drum from the pin 36, the semi-rotation of the drum and the display of the contrasting color.

It will be seen, therefore, that the indicator is operable only as a result of movement of the control lever to its full extent necessary to completely operate an actuating member and close the switch, and that once the lever is so moved, the indicator acts quickly and automatically,—that is, its action is independent of any further manipulation of the control lever once its own movement is initiated.

In Fig. II, I have shown lights 40, 41, covered respectively by a red shade 42, and a green shade 43, which are connected to respective auxiliary switches actuated by the remote controlled circuit breaker. The closing or opening of the latter will thus be made visible on the front of the board by the illumination of the red or green shade respectively. However, since the lights are liable to burn out, the indicator herein described has been provided as a supplemental safeguard, whereby the operator may know the actual conditions existing in the remote controlled apparatus.

Having thus described my invention, I claim:

1. In a device of the character described, the combination of a control lever; actuating members selectively operable by said control lever; an indicator, the action of which is dependent upon the alternate throwing of the control lever; and means for preventing the action of said indicator until the selected actuating member has been moved to its full extent.

2. In a device of the character described, the combination of a control lever; plungers selectively operable by the said control lever; an indicator, the action of which is dependent upon the alternate throwing of the control lever; and means for preventing the action of said indicator until the selected plunger has been moved to the full extent.

3. In a device of the character described, the combination of a control lever; actuating members selectively operable thereby; and an automatic quick-acting indicator operable only as a result of movement of the control lever to its full extent necessary to operate an actuating member.

4. In a device of the character specified, the combination of a pivoted control lever; a rotating indicator member having contrasting signs on opposite sides; a lock whereby said rotating member is normally held with one or the other sign displayed; a coiled spring interposed between the control lever and said rotatable member, whereby the latter is placed under torsion by the movement of the control lever; and means whereby when the control lever has reached the extreme position required to do its work, said rotating member is released from its lock and compelled to effect a semi-rotation due to the torsional action of said spring.

5. In a device of the character specified, the combination of a pivoted control lever; a rotating indicator member having contrasting signs on opposite sides; a lock whereby said rotating member is normally held with one or the other sign displayed; a coiled spring interposed between the control lever and said rotatable member, whereby the latter is placed under torsion by the movement of the control lever; means whereby when the control lever has reached the extreme position required to do its work, said rotating member is released from its lock and compelled to effect a semi-rotation due to the torsional action of said spring; and means for limiting the extent of movement of said indicator member.

6. In a device of the character specified, the combination of a pivoted control lever; a rotating indicator member having contrasting signs on opposite sides; a coiled spring interposed between the control lever and said indicator member, whereby the latter is placed under torsion by the movement of the control lever; a locking means whereby said rotating member is normally held with one or the other of its contrasting signs displayed, consisting of a spring-pressed cradle; a pair of fixed pivots alternately functional as fulcrums for the said cradle; a locking pin carried by said cradle and coöperative with apertures in the periphery of said rotatable indicator member; projections formed upon said cradle, lying in the path of said control lever, whereby when the cradle is swung upon either of its fulcrums, the locking pin is disengaged from the aperture in the rotatable indicator member, and the latter released and compelled to effect a semi-rotation under the torsional action of its coiled spring.

7. In a device of the character specified, the combination of a control lever bifurcated at its pivoted ends; an indicator drum mounted for independent rotation on said pivot between the said bifurcations and having its periphery contrastedly marked on opposite sides; a coiled actuating spring housed within said drum, and having one of its ends fixed to the drum and the other to said lever, whereby the movement of the latter places said spring under torsion; a stop whereby said indicator drum is held with one or the other of its signs displayed; and means whereby when the control lever has reached the extreme position required to do its work, said drum is released from its stop and compelled to effect a semi-rotation due to the torsional action of its actuating spring.

8. In a device of the character specified, the combination of a control lever bifurcated at its pivoted end; an indicator drum mounted for independent rotation on said pivot, between the said bifurations and having its periphery contrastedly marked on opposite sides; a coiled actuating spring housed within said drum and having one of its ends fixed to the drum and the other to said lever, whereby the movement of the latter places said spring under torsion; a stop whereby said indicator drum is held with one or the other of its signs displayed; means whereby when the control lever has reached the extreme position required to do its work, said drum is released from its stop and compelled to effect a semi-rotation due to the torsional action of its actuating spring, and means for limiting the rotative movement of said drum including a fixed stop and a pair of coöperative stops carried by said drum.

In testimony whereof I have hereunto signed my name at the borough of Manhattan, New York city this 24th day of January, 1918.

FERDINAND BECHOFF.

Witnesses:
 MAURICE M. SAMUELS,
 BLANCHE GREENWALD.